(12) United States Patent
Park

(10) Patent No.: US 11,333,453 B2
(45) Date of Patent: May 17, 2022

(54) VEHICLE HEAT EXCHANGER AND VEHICLE FRONT STRUCTURE HAVING THE SAME

(71) Applicants: HYUNDAI MOTOR COMPANY, Seoul (KR); KIA MOTORS CORPORATION, Seoul (KR)

(72) Inventor: Yong Min Park, Incheon (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 37 days.

(21) Appl. No.: 16/904,980

(22) Filed: Jun. 18, 2020

(65) Prior Publication Data

US 2021/0140725 A1    May 13, 2021

(30) Foreign Application Priority Data

Nov. 11, 2019  (KR) ................ 10-2019-0143693

(51) Int. Cl.
*F28F 13/18* (2006.01)
*F28F 1/12* (2006.01)
*F28D 1/053* (2006.01)
*F28F 21/02* (2006.01)

(52) U.S. Cl.
CPC .......... *F28F 13/18* (2013.01); *F28D 1/05366* (2013.01); *F28F 1/126* (2013.01); *F28F 21/02* (2013.01)

(58) Field of Classification Search
CPC ............ F28F 13/18–187; F28F 21/02; F28F 2245/00; F28F 2245/06; F28F 1/126; F28D 1/05366; F28D 1/0435; F28D 1/0452
See application file for complete search history.

(56) References Cited

U.S. PATENT DOCUMENTS

| | | | | |
|---|---|---|---|---|
| 5,046,554 A | * | 9/1991 | Iwasaki ................ | F28D 1/0435 165/140 |
| 5,086,835 A | * | 2/1992 | Shinmura ............. | F28D 1/0435 123/41.51 |
| 5,176,200 A | * | 1/1993 | Shinmura ............. | F28D 1/0435 165/144 |
| 5,476,138 A | * | 12/1995 | Iwasaki ............. | B60H 1/00321 165/41 |
| 6,340,066 B1 | * | 1/2002 | Dettling ................ | B01D 53/02 180/54.1 |
| 8,571,749 B2 | * | 10/2013 | Kawato ................ | B60K 11/085 701/29.2 |

(Continued)

OTHER PUBLICATIONS

NanoLetters—Photothermal Self-Oscillation and Laser Cooling of Graphene—Aug. 13, 2012 (Year: 2012).*

(Continued)

*Primary Examiner* — Jianying C Atkisson
*Assistant Examiner* — Jose O Class-Quinones
(74) *Attorney, Agent, or Firm* — McDonnell Boehnen Hulbert & Berghoff LLP

(57) ABSTRACT

Provided is a vehicle heat exchanger including a plurality of tubes through which a fluid flows, a plurality of cooling fins interposed between adjacent tubes, and a graphene material attached to a surface of each tube and/or a surface of each cooling fin. The graphene material may include a first graphene layer and a second graphene layer stacked on the first graphene layer.

7 Claims, 5 Drawing Sheets

(56) References Cited

U.S. PATENT DOCUMENTS

| | | | | |
|---|---|---|---|---|
| 8,627,911 B2* | 1/2014 | Tregnago | ............ | B60K 11/085 180/68.1 |
| 9,669,681 B2* | 6/2017 | Oono | ............ | B60K 11/04 |
| 2001/0050160 A1* | 12/2001 | Ozawa | ............ | B62D 25/084 165/67 |
| 2002/0056541 A1* | 5/2002 | Kokubunji | ............ | B60K 11/04 165/67 |
| 2003/0201133 A1* | 10/2003 | Kobayashi | ............ | B60K 5/02 180/291 |
| 2004/0108097 A1* | 6/2004 | Ueda | ............ | B60K 11/04 165/42 |
| 2004/0194912 A1* | 10/2004 | Honda | ............ | B60H 1/004 165/42 |
| 2005/0217832 A1* | 10/2005 | Sanada | ............ | F28F 9/002 165/140 |
| 2005/0274507 A1* | 12/2005 | Sanada | ............ | F25B 39/04 165/202 |
| 2007/0051488 A1* | 3/2007 | Hori | ............ | F04D 29/582 165/41 |
| 2007/0062671 A1* | 3/2007 | Sugimoto | ............ | F28F 9/002 165/67 |
| 2007/0144713 A1* | 6/2007 | Sugimoto | ............ | F28D 1/0452 165/140 |
| 2007/0193730 A1* | 8/2007 | Ozaki | ............ | F28F 1/128 165/140 |
| 2008/0185125 A1* | 8/2008 | Prior | ............ | B60K 11/04 165/86 |
| 2009/0301411 A1* | 12/2009 | Iwasaki | ............ | F01P 3/2285 123/41.23 |
| 2009/0314266 A1* | 12/2009 | Hori | ............ | F01P 7/165 123/568.12 |
| 2010/0243352 A1* | 9/2010 | Watanabe | ............ | B60K 11/085 180/68.1 |
| 2011/0140464 A1* | 6/2011 | Mildner | ............ | B60K 11/04 293/115 |
| 2011/0288717 A1* | 11/2011 | Yu | ............ | B60K 11/085 701/31.4 |
| 2012/0100790 A1* | 4/2012 | Miesterfeld | ............ | F01P 7/10 454/75 |
| 2013/0103265 A1* | 4/2013 | Remy | ............ | B60K 11/085 701/49 |
| 2013/0223980 A1* | 8/2013 | Pastrick | ............ | F01D 5/00 415/1 |
| 2013/0268164 A1* | 10/2013 | Sugiyama | ............ | B60K 11/085 701/49 |
| 2015/0330288 A1* | 11/2015 | Nam | ............ | B60K 11/06 165/96 |
| 2016/0076829 A1* | 3/2016 | Lee | ............ | B32B 15/09 428/41.8 |
| 2016/0079639 A1* | 3/2016 | Pinon | ............ | H01M 10/6555 429/120 |
| 2017/0067702 A1* | 3/2017 | Suwa | ............ | F28F 13/18 |
| 2018/0100232 A1* | 4/2018 | Farquhar | ............ | C23C 16/56 |
| 2018/0100233 A1* | 4/2018 | Farquhar | ............ | B01D 1/00 |
| 2018/0212289 A1* | 7/2018 | Pinon | ............ | H01M 50/20 |
| 2018/0230590 A1* | 8/2018 | Farquhar | ............ | C22C 1/08 |
| 2018/0248238 A1 | 8/2018 | Pinon | | |
| 2019/0001807 A1* | 1/2019 | Han | ............ | F28D 1/0443 |
| 2019/0143921 A1* | 5/2019 | Tian | ............ | F28F 27/02 180/68.1 |
| 2019/0186852 A1* | 6/2019 | Li | ............ | C23C 16/26 |

OTHER PUBLICATIONS

Optica—Raman cooling of solids through photonic density of states engineering—Jul. 15, 2015 (Year: 2015).*

* cited by examiner

VEHICLE HEAT EXCHANGER AND VEHICLE FRONT STRUCTURE HAVING THE SAME

CROSS REFERENCE TO RELATED APPLICATIONS

This application is based on and claims the benefit of priority to Korean Patent Application No. 10-2019-0143693, filed on Nov. 11, 2019, in the Korean Intellectual Property Office, the disclosure of which is incorporated herein in its entirety by reference.

TECHNICAL FIELD

The present disclosure relates to a vehicle heat exchanger and a vehicle front structure having the same, and more particularly, to a vehicle heat exchanger with a graphene material attached to the surfaces of heat exchange elements (tubes, cooling fins, etc.), and a vehicle front structure having the same.

BACKGROUND

A heat exchanger is a system used to transfer heat between two or more fluids. In a broad sense, it includes a heater, a cooler, a condenser, and the like, and is usually designed for the purpose of recovering heat. Such heat exchangers may be applied to various industrial fields such as vehicles, boilers, ships, and facilities.

Meanwhile, a vehicle has a grille disposed at a front end thereof, and the grille has a plurality of openings that permit air to flow into a front compartment. The front compartment is located behind the grille, and receives a plurality of heat exchangers such as a condenser, a radiator, and an intercooler. A cooling fan is located behind the heat exchangers. As the cooling fan operates, the air passing through the grille comes into contact with the heat exchangers, the heat exchangers may be cooled.

The heat exchangers disposed in the front compartment need to ensure higher cooling performance in accordance with the vehicle's high performance and an increase in total heat transfer, and the development of eco-friendly vehicles. When an opening area at the front end of the vehicle is increased to secure the cooling performance of the heat exchangers, the exterior design and aerodynamic performance of the vehicle may be degraded. In addition, various auxiliary devices may be required to secure the cooling performance of the heat exchangers, which may increase material and manufacturing costs.

The above information described in this background section is provided to assist in understanding the background of the inventive concept, and may include any technical concept which is not considered as the prior art that is already known to those skilled in the art.

SUMMARY

The present disclosure has been made to solve the above-mentioned problems occurring in the prior art while advantages achieved by the prior art are maintained intact.

An aspect of the present disclosure provides a vehicle heat exchanger with a graphene material attached to the surfaces of heat exchange elements (tubes and/or cooling fins), and a vehicle front structure having the same.

According to an aspect of the present disclosure, a vehicle heat exchanger may include: a plurality of tubes through which a fluid flows; a plurality of cooling fins interposed between adjacent tubes; and a graphene material attached to a surface of each tube and/or a surface of each cooling fin.

The graphene material may include a first graphene layer and a second graphene layer stacked on the first graphene layer.

The first graphene layer may have a first honeycomb lattice and a first axis extending along the first honeycomb lattice, the second graphene layer may have a second honeycomb lattice and a second axis extending along the second honeycomb lattice, and the first axis of the first graphene layer and the second axis of the second graphene layer may intersect at a predetermined twist angle.

The vehicle heat exchanger may further include a laser irradiator irradiating the graphene material with a laser of an infrared region.

The laser irradiator may be disposed in front of the tubes and the cooling fins or behind the tubes and the cooling fins.

According to another aspect of the present disclosure, a vehicle front structure may include: a front end body; a front compartment sealed by the front end body; a plurality of heat exchangers received in the front compartment, wherein each heat exchanger may include: a plurality of heat exchange elements; and a graphene material attached to each heat exchange element.

The vehicle front structure may further include a laser irradiator irradiating the graphene material of each heat exchanger with a laser of an infrared region.

The graphene material may include a first graphene layer and a second graphene layer stacked on the first graphene layer.

The first graphene layer may have a first honeycomb lattice and a first axis extending along the first honeycomb lattice, the second graphene layer may have a second honeycomb lattice and a second axis extending along the second honeycomb lattice, and the first axis of the first graphene layer and the second axis of the second graphene layer may intersect at a predetermined twist angle.

BRIEF DESCRIPTION OF THE FIGURES

The above and other objects, features and advantages of the present disclosure will be more apparent from the following detailed description taken in conjunction with the accompanying drawings.

DETAILED DESCRIPTION

Figure 1:
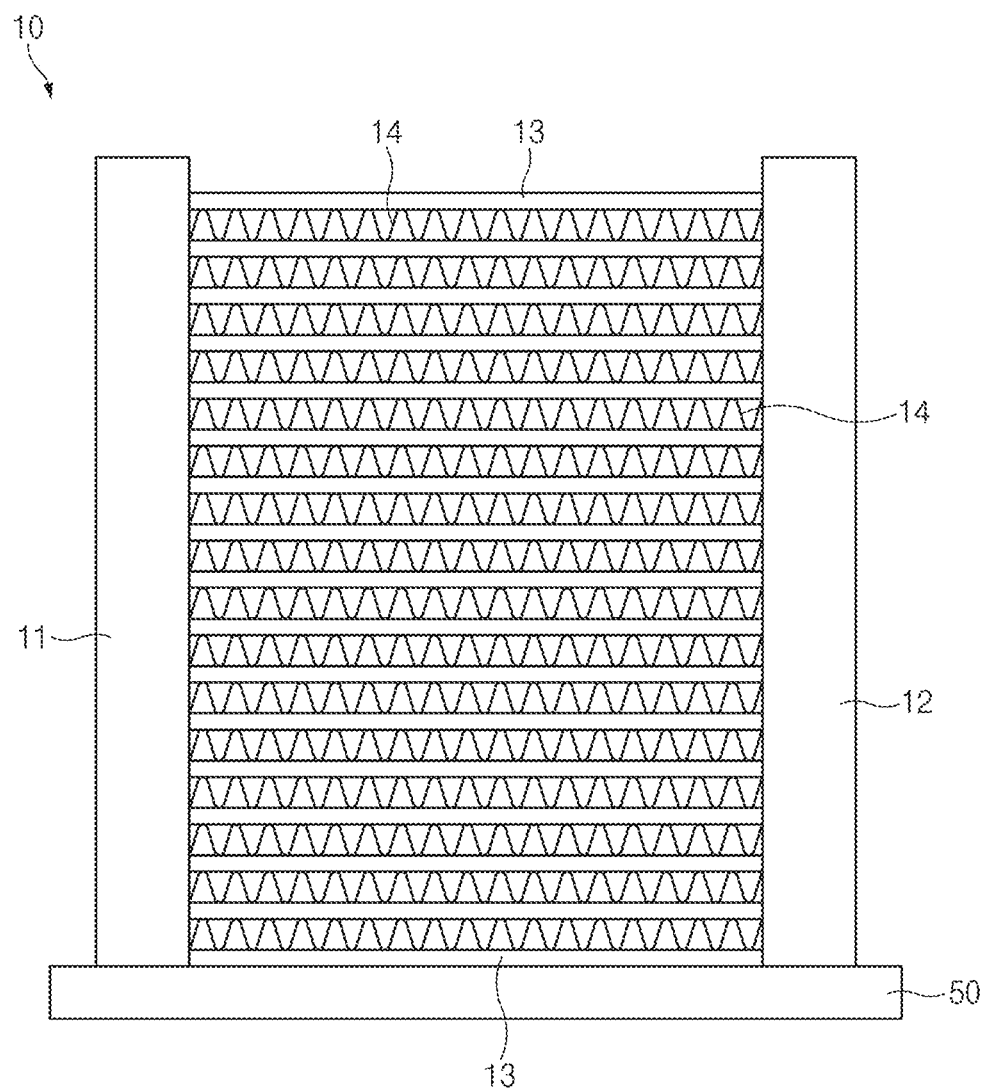
FIG. 1 illustrates a vehicle heat exchanger according to an exemplary embodiment of the present disclosure.

Hereinafter, exemplary embodiments of the present disclosure will be described in detail with reference to the accompanying drawings. In the drawings, the same reference numerals will be used throughout to designate the same or equivalent elements. In addition, a detailed description of well-known techniques associated with the present disclosure will be ruled out in order not to unnecessarily obscure the gist of the present disclosure.

Terms such as first, second, A, B, (a), and (b) may be used to describe the elements in exemplary embodiments of the present disclosure. These terms are only used to distinguish one element from another element, and the intrinsic features, sequence or order, and the like of the corresponding elements are not limited by the terms. Unless otherwise defined, all terms used herein, including technical or scientific terms, have the same meanings as those generally understood by those with ordinary knowledge in the field of art to which the present disclosure belongs. Such terms as those defined in a generally used dictionary are to be interpreted as having meanings equal to the contextual meanings in the relevant field of art, and are not to be interpreted as having ideal or excessively formal meanings unless clearly defined as having such in the present application.

Referring to FIG. 1, a heat exchanger 10 according to an exemplary embodiment of the present disclosure may include a plurality of tubes 13 disposed between an inlet header 11 and an outlet header 12, and a plurality of cooling fins 14 interposed between adjacent tubes 13.

Figure 5:
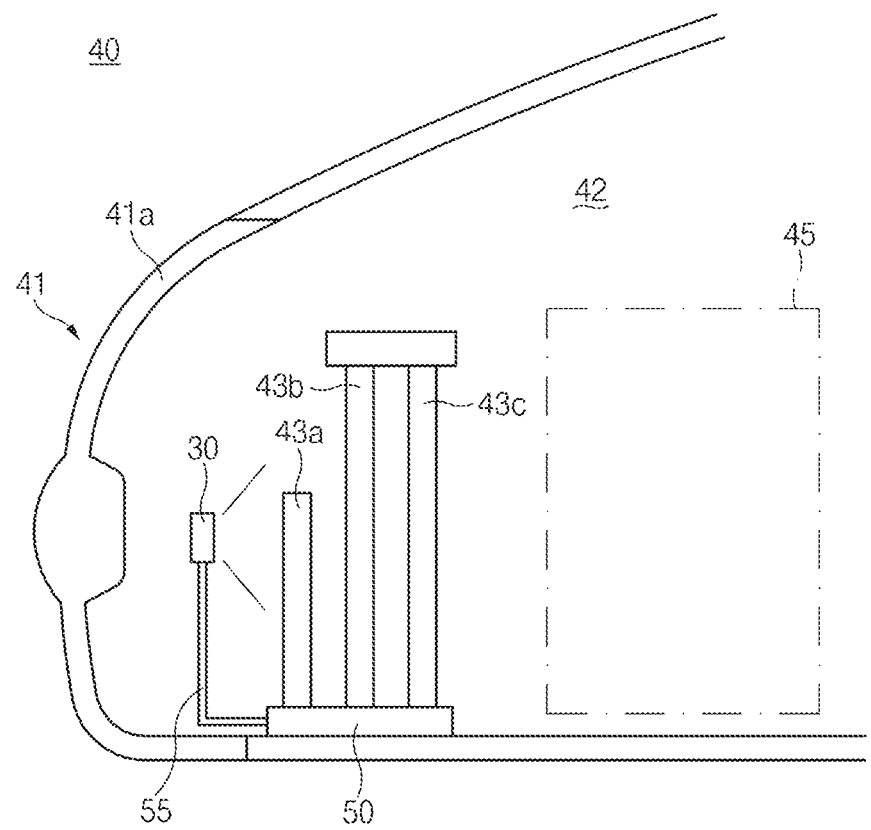
FIG. 5 illustrates a vehicle front structure according to an exemplary embodiment of the present disclosure.

The heat exchanger 10 may include heat exchangers for a vehicle, such as an intercooler 43a, a condenser 43b, and a radiator 43c illustrated in FIG. 5.

The inlet header 11 may receive fluids such as compressed air, coolant, and refrigerant. The outlet header 12 may discharge the fluids having passed through the tubes 13.

The plurality of tubes 13 may extend to connect between the inlet header 11 and the outlet header 12, and the plurality of tubes 13 may be arranged to be parallel to each other. Each tube 13 may have an inlet into which the fluid is introduced, and an outlet from which the fluid is discharged. The inlet of the tube 13 may communicate with the inlet header 11, and the outlet of the tube 13 may communicate with the outlet header 12.

Adjacent tubes 13 may be spaced apart from each other to allow the cooling fins 14 to be interposed therebetween. Each cooling fin 14 may have a corrugated shape. The tube 13 and/or the cooling fin 14 may be made of a metal material having high thermal conductivity such as an aluminum alloy.

Figure 2:
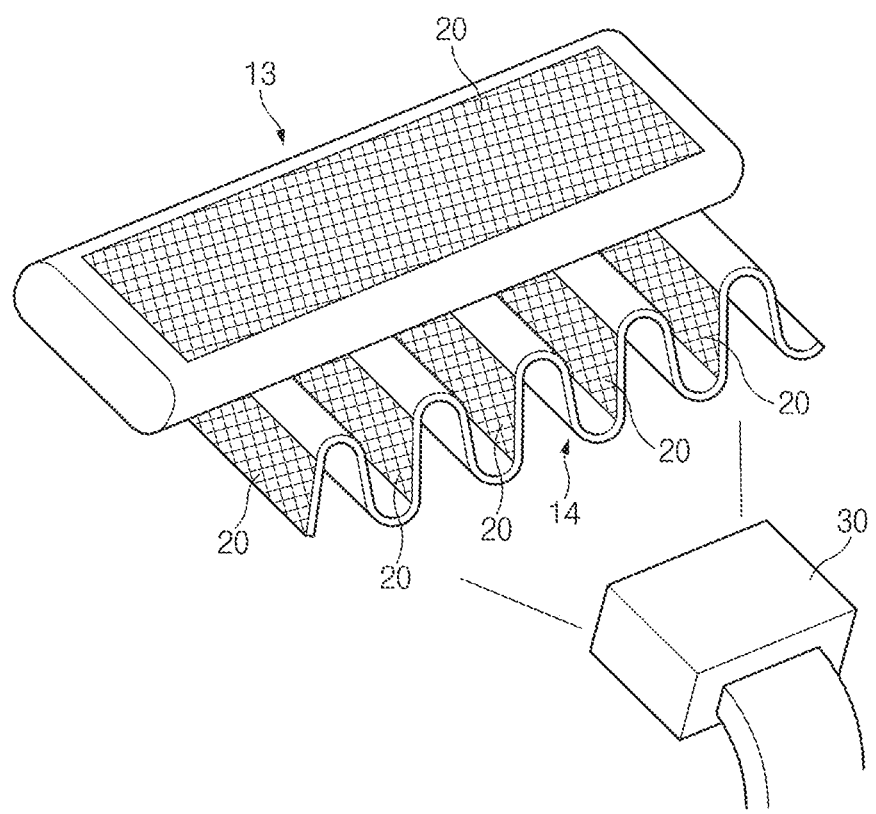
FIG. 2 illustrates a tube, a cooling fin, and a laser irradiator in a vehicle heat exchanger according to an exemplary embodiment of the present disclosure.

Referring to FIG. 2, a graphene material 20 may be attached to a surface of the tube 13 and/or a surface of the cooling fin 14.

Graphene is an allotrope of carbon in the form of a single layer of carbon atoms in a two-dimensional hexagonal lattice in which one carbon atom forms each vertex. This shape is called a honeycomb structure or hexagonal structure, or a honeycomb lattice or hexagonal lattice. Graphene is a thin film having a thickness of one atom, its thickness being 0.2 nm (1 nanometer (nm) is equal to one billionth of a meter). That is, its thickness is about 10 billionth of 2 meters, which is extremely thin. Graphene has very high physical and chemical stability. Other allotropes of carbon include graphite, carbon nanotubes, fullerenes, and diamonds. Graphene has the thickness of a single layer of atoms, resulting in the same bonding structure, but it exhibits different properties from those of graphite having several layers. Graphene has high intrinsic electron mobility, high thermal conductivity, and large theoretical specific surface area (SSA). As it consists of one layer, it has very low absorption of visible light, and its transmission rate of light having a wavelength of 550 nm is 97.7%. Graphene has excellent strength, which is more than 200 times stronger than steel, and excellent thermal conductivity, which is more than 2 times higher than diamond of very high thermal conductivity. Graphene has excellent elasticity, so it does not lose its electrical properties when stretched or bent. In addition, graphene is able to exhibit extremely opposite characteristics of superconduction and insulation.

Figure 3:
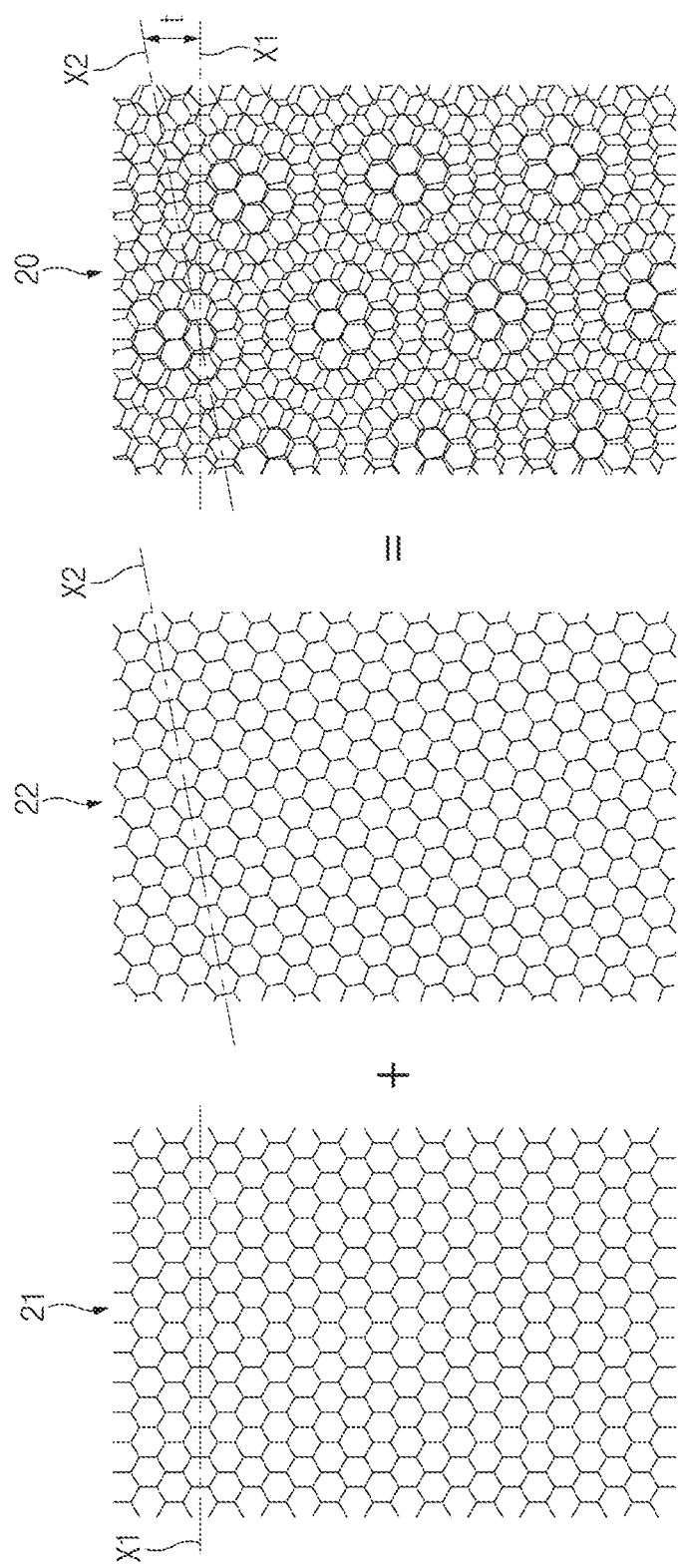
FIG. 3 illustrates a structure of a graphene material formed by a stack of first and second graphene layers in a vehicle heat exchanger according to an exemplary embodiment of the present disclosure.

Referring to FIG. 3, the graphene material 20 may include a first graphene layer 21 and a second graphene layer 22 stacked on the first graphene layer 21. The first graphene layer 21 may have a first honeycomb lattice and a first axis X1 extending along the first honeycomb lattice. The second graphene layer 22 may have a second honeycomb lattice and a second axis X2 extending along the second honeycomb lattice. The first axis X1 of the first graphene layer 21 and the second axis X2 of the second graphene layer 22 may intersect at a predetermined twist angle t. The first graphene layer 21 and the second graphene layer 22 may be stacked at the predetermined twist angle t. For example, the twist angle t may be a magic angle of 11.3°.

According to an exemplary embodiment, the graphene material 20 may be attached to the surface of each cooling fin 14. The graphene material 20 may be attached to a portion of the surface of the cooling fin 14 or to the entirety of the surface of the cooling fin 14.

According to another exemplary embodiment, the graphene material 20 may also be attached to the surface of each tube 13. The graphene material 20 may be attached to a portion of the surface of the tube 13 or to the entirety of the surface of the tube 13.

According to another exemplary embodiment, the graphene material 20 may be attached to the surface of the tube 13 and the surface of the cooling fin 14. Referring to FIG. 2, the graphene material 20 may be attached to the surface of the tube 13 and the surface of the cooling fins 14.

Referring to FIG. 2, the heat exchanger 10 according to an exemplary embodiment of the present disclosure may further include a laser irradiator 30 irradiating the graphene material 20 with a laser. In particular, the laser irradiator 30 may irradiate the graphene material 20 with the laser of an infrared region, thereby reducing the vibrations of atoms in the graphene material 20. In detail, when the infrared laser is applied to the graphene material 20, phonons are removed from the graphene material 20 and are transmitted to other places through Raman scattering so that the graphene material 20 may be cooled. Since the graphene material 20 is significantly cooled to low temperature through the Raman scattering by the laser, the fluid flowing through an inner passage of the tube 13 may be cooled by the cooling of the graphene material 20.

Figure 4:
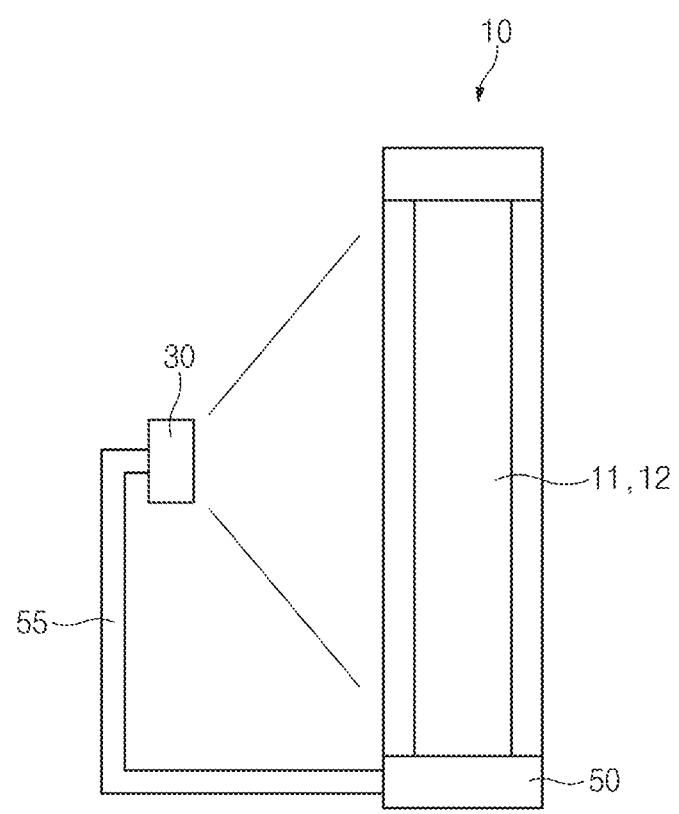
FIG. 4 illustrates a side view of a vehicle heat exchanger according to an exemplary embodiment of the present disclosure.

Referring to FIG. 4, the heat exchanger 10 according to an exemplary embodiment of the present disclosure may further include a support structure 50 supporting the inlet header 11, the outlet header 12, the plurality of tubes 13, and the plurality of cooling fins 14. The laser irradiator 30 may be mounted to the support structure 50 using a connecting arm 55. The laser irradiator 30 may be arranged to uniformly apply the laser to the graphene material 20 attached to the surfaces of the tubes 13 and/or the surfaces of the cooling fins 14. The support structure 50 may be mounted on a vehicle front structure 40 as illustrated in FIG. 5.

According to an exemplary embodiment, the laser irradiator 30 may be disposed in front of the tubes 13 and the cooling fins 14 or behind the tubes 13 and the cooling fins 14 so that it may uniformly apply the laser to the entirety of the graphene material 20.

According to another exemplary embodiment, the laser irradiator 30 may be movably mounted in front of the tubes 13 and the cooling fins 14 or be movably mounted behind the tubes 13 and the cooling fins 14.

Referring to FIG. 5, the vehicle front structure 40 may include a front end body 41, a front compartment 42 sealed by the front end body 41, and the plurality of heat exchangers 43a, 43b, and 43c received in the front compartment 42.

The front end body 41 may have a wall 41a which is fully closed with respect to the outside of the vehicle, so that the front compartment 42 may be sealed by the closed wall 41a of the front end body 41 from the outside of the vehicle. The front compartment 42 may receive a prime mover 45 such as an engine or an electric motor. For example, an internal combustion engine in an internal combustion engine vehicle may be received in the front compartment 42, and an electric motor in an electric vehicle may be received in the front compartment 42.

In addition, the front compartment 42 may receive the plurality of heat exchangers, such as the intercooler 43a, the condenser 43b, and the radiator 43c.

Referring to FIG. 5, the intercooler 43a may be located in front of the condenser 43b and the radiator 43c, and the condenser 43b may be located in front of the radiator 43c. According to another exemplary embodiment, the condenser 43b may be located behind the radiator 43c. The arrangement of the condenser 43b and the radiator 43c may be varied according to vehicle types.

The intercooler 43a, the condenser 43b, and the radiator 43c may include the plurality of tubes 13 disposed between the inlet header 11 and the outlet header 12, and the plurality of cooling fins 14 interposed between the tubes 13, as illustrated in FIG. 1. The graphene material 20 may be attached to the surfaces of heat exchange elements such as the tubes 13 and the cooling fins 14.

Referring to FIG. 5, the laser irradiator 30 may be disposed in front of the heat exchangers 43a, 43b, and 43c within the front compartment 42. In particular, the laser irradiator 30 may be attached to an inboard surface of the front end body 41.

According to another exemplary embodiment, the laser irradiator 30 may be disposed behind the heat exchangers 43a, 43b, and 43c within the front compartment 42.

In the above-described configuration according to exemplary embodiments of the present disclosure, as the graphene material 20 having high thermal conductivity, which is more than 15 times higher than that of aluminum alloy, is attached to the surfaces of the heat exchange elements 13 and 14 of the heat exchanger, the size of the heat exchanger may be reduced to ¹⁄₁₅ of an existing one. Thus, the weight and packaging structure of the vehicle front structure 40 may be significantly improved.

In addition, as the infrared laser is irradiated to the graphene material 20, without the need of air which is a cooling medium coming into contact with the heat exchanger, there is no need to have openings such as a grille in the front end body 41, and thus the exterior design and aerodynamic performance of the vehicle may be improved. In particular, by precisely controlling the cooling of the graphene material 20 using the laser, the cooling of the heat exchanger may be precisely controlled.

As set forth above, according to exemplary embodiments of the present disclosure, the graphene material may be attached to the surfaces of the heat exchange elements such as the tubes and the cooling fins, so that the performance of the heat exchanger may be significantly improved.

According to exemplary embodiments of the present disclosure, as the graphene material having high thermal conductivity, which is more than 15 times higher than that of aluminum alloy, is attached to the surfaces of the heat exchange elements, the size of the heat exchanger may be reduced to $1/15$ of the existing one. Thus, the weight and packaging structure of the vehicle front structure may be significantly improved.

According to exemplary embodiments of the present disclosure, as the infrared laser is irradiated to the graphene material, without the need of air which is a cooling medium coming into contact with the heat exchanger, there is no need to have openings such as a grille in the front end body, and thus the exterior design and aerodynamic performance of the vehicle may be improved. In particular, by precisely controlling the cooling of the graphene material using the laser, the cooling of the heat exchanger may be precisely controlled.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

The invention claimed is:

1. A vehicle heat exchanger, comprising:
   a plurality of tubes through which a fluid flows;
   a plurality of cooling fins interposed between adjacent tubes;
   a graphene material attached to a surface of each tube and/or a surface of each cooling fin; and
   a laser irradiator irradiating the graphene material with a laser of an infrared region.

2. The vehicle heat exchanger according to claim 1, wherein the graphene material includes a first graphene layer and a second graphene layer stacked on the first graphene layer.

3. The vehicle heat exchanger according to claim 2, wherein the first graphene layer has a first honeycomb lattice and a first axis extending along the first honeycomb lattice,
   the second graphene layer has a second honeycomb lattice and a second axis extending along the second honeycomb lattice, and
   the first axis of the first graphene layer and the second axis of the second graphene layer intersect at a predetermined twist angle.

4. The vehicle heat exchanger according to claim 1, wherein the laser irradiator is disposed in front of the tubes and the cooling fins or behind the tubes and the cooling fins.

5. A vehicle front structure, comprising:
   a front end body;
   a front compartment sealed by the front end body;
   a plurality of heat exchangers received in the front compartment,
   wherein each heat exchanger includes:
   a plurality of heat exchange elements; and
   a graphene material attached to each heat exchange element and
   a laser irradiator irradiating the graphene material of each heat exchanger with a laser of an infrared region.

6. The vehicle front structure according to claim 5, wherein the graphene material includes a first graphene layer and a second graphene layer stacked on the first graphene layer.

7. The vehicle front structure according to claim 6, wherein the first graphene layer has a first honeycomb lattice and a first axis extending along the first honeycomb lattice, the second graphene layer has a second honeycomb lattice and a second axis extending along the second honeycomb lattice, and the first axis of the first graphene layer and the second axis of the second graphene layer intersect at a predetermined twist angle.

\* \* \* \* \*